R. H. BLACKALL.
RATCHET BRAKE MECHANISM.
APPLICATION FILED NOV. 17, 1916.
1,252,539.
Patented Jan. 8, 1918.
2 SHEETS—SHEET 1.
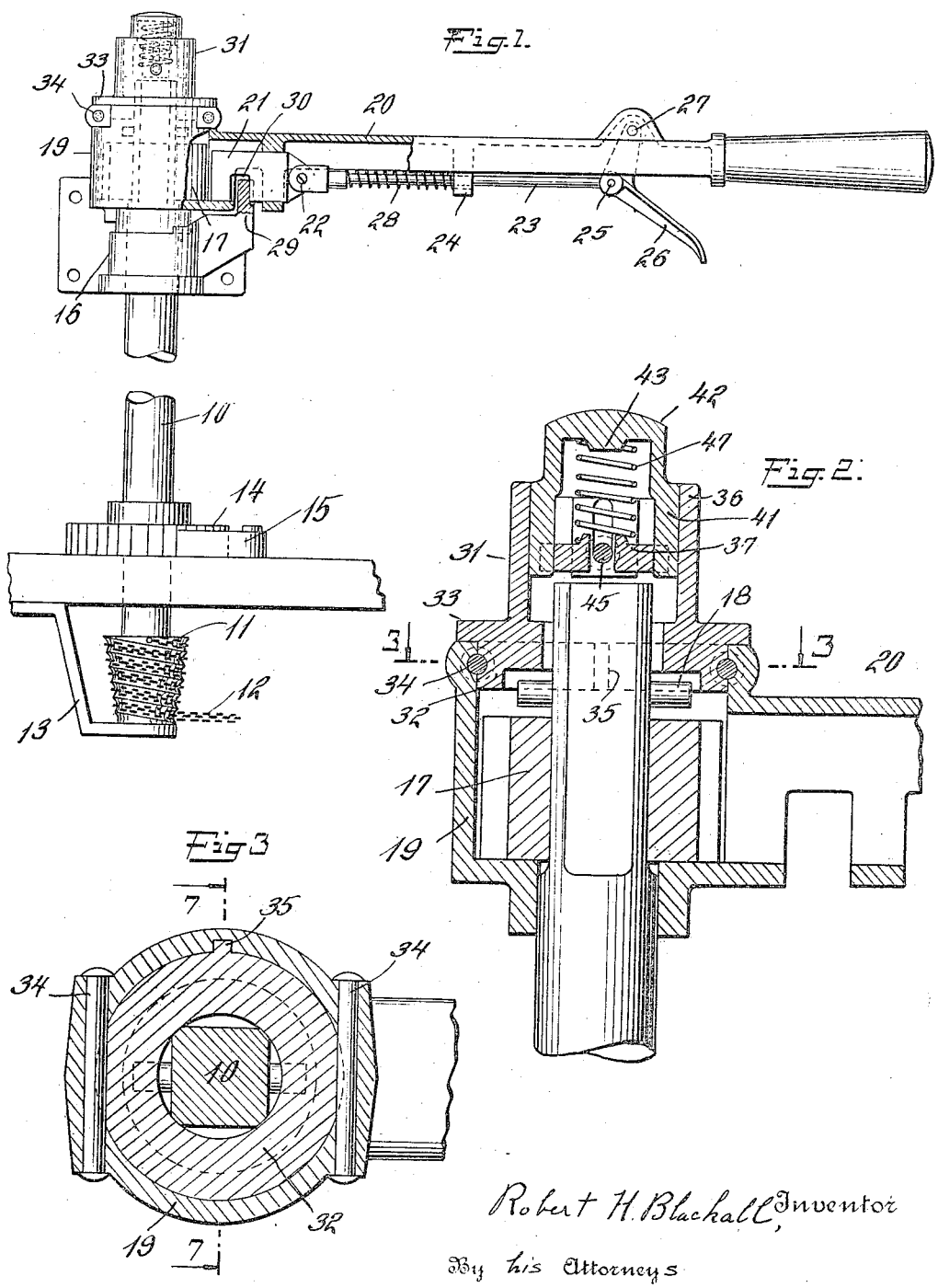
Robert H. Blackall, Inventor
By his Attorneys
Pennie, Davis & Marvin.

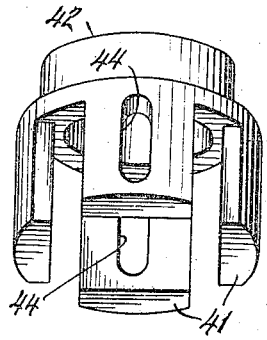
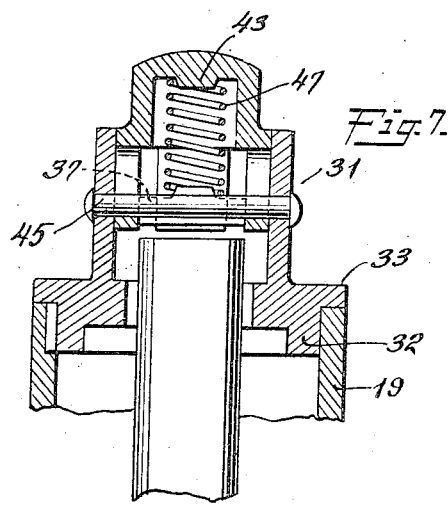
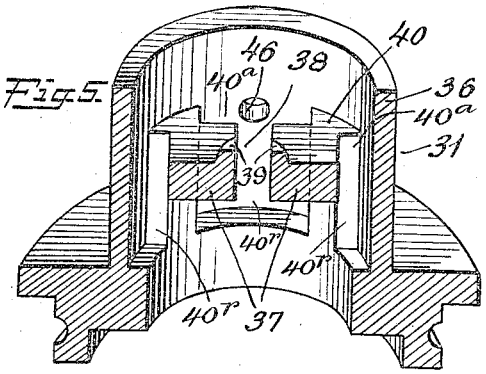
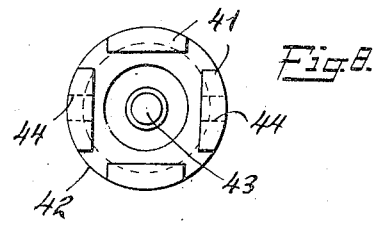
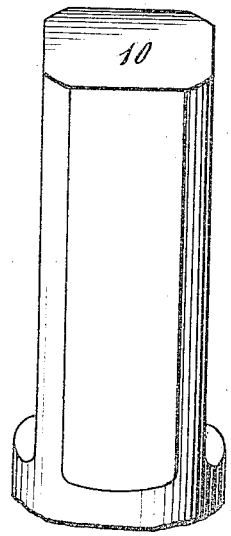
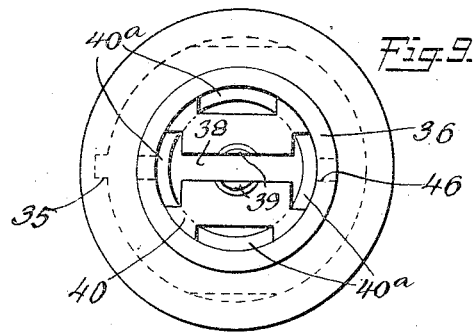

UNITED STATES PATENT OFFICE.

ROBERT H. BLACKALL, OF LAKE MAHOPAC, NEW YORK, ASSIGNOR TO RATCHET BRAKE COMPANY, OF NEW YORK, N. Y., A CORPORATION OF DELAWARE.

RATCHET-BRAKE MECHANISM.

1,252,539.  Specification of Letters Patent.  Patented Jan. 8, 1918.

Application filed November 17, 1916. Serial No. 131,835.

*To all whom it may concern:*

Be it known that I, ROBERT H. BLACKALL, a citizen of the United States, and resident of Lake Mahopac, in the county of Putnam, State of New York, have invented certain new and useful Improvements in Ratchet-Brake Mechanism; and I do hereby declare the following to be a full, clear, and exact description of the invention, such as will enable others skilled in the art to which it appertains to make and use the same.

This invention relates to that class of hand-actuated brake mechanisms wherein an oscillating movement of an operating lever or handle is, through the medium of suitable clutch mechanism, converted into a brake-applying movement of the brake-staff. In devices of this character it sometimes happens that after effecting an application of the brakes in this way and subsequent release of the brake-staff, the device will stick and fail to release properly owing to the fact that the turns of the chain on the staff become wedged or entangled one in another or jammed against the brake-staff support or other parts of the car so that when the brake-staff is released the chain will not freely unwind from the staff and the brake-shoes will remain in contact with the wheel, thus leaving the brakes set or dragging, although the staff has been completely freed. If at such times the brake-staff could be given a positive reverse or brake-releasing movement this would be sufficient in most cases to effect a proper release of the brakes. As the function of the clutch mechanism is to couple the handle to the staff in the brake-applying direction of movement and to uncouple the handle in its reverse or retractive movement, such clutch mechanism is ordinarily incapable of being utilized for the purpose of effecting a brake-releasing movement of the staff.

The object of the present invention is to provide simple and efficient means by which a reverse or brake-releasing movement may be imparted positively to the brake-staff.

The invention accordingly consists in providing means associated with the operating lever of the brake, adapted to be moved into engagement with the brake-staff to thereby lock the latter to the lever whereby the staff may be moved in either direction at will by corresponding movements of the lever.

The details of the present invention together with further objects and advantages will become clear from the following detailed description, which is to be taken in conjunction with the accompanying drawings, wherein—

Figure 1 is an elevational view partly in section, of hand-actuated brake mechanism embodying the invention; Fig. 2 is an enlarged sectional view of a portion of the mechanism of Fig. 1; Fig. 3 is a section along the line 3—3 of Fig. 2; Fig. 4 is a perspective view of the movable part of the back-off cap; Fig. 5 is a sectional perspective view of the fixed part of the back-off cap; Fig. 6 is a perspective view of the upper end of the brake-staff; Fig. 7 is a sectional view through the back-off cap taken along the line 7—7 of Fig. 3; Fig. 8 is a bottom plan view of the portion of the back-off cap shown in Fig. 4; and Fig. 9 is a top plan view of the portion of the back-off cap shown in Fig. 5.

Referring to the drawings, in which similar reference characters denote similar parts throughout the several views thereof, the brake-staff 10 is provided near its bottom with a winding drum 11 which may be of the approved conical form and about which the brake chain 12 is wound when the brakes are to be applied. The lower end of the brake-staff is supported by any suitable form of bracket 13. The brake-staff is equipped with a suitable holding ratchet 14 and foot pawl 15 located on the platform of the car or otherwise accessible for hand or foot operation. Near the top of the brake-staff and serving as a bearing therefor is a support 16 which may be of any approved design and secured to the vestibule or end of a car or to the hand rail or other fixture of the car structure in accordance with a common practice. The top of the brake staff 10 is preferably made square or at least of irregular cross-section and carries a ratchet 17 which may be prevented from moving upward upon the end of the staff by a transverse pin 18. Inclosing the ratchet and mounted to rotate about the brake-staff is a housing or sleeve 19 positioned above the support 16 and having secured thereto in any suitable manner, as by being made integral therewith, an operating lever or handle 20. The housing and the inner end of the operating lever are arranged to form guideways for a pawl 21 adapted to engage the ratchet 17. To the outer end of the pawl is connected by means of a screw 22 a pull-bar 23 passed through a supporting web 24 under the operating lever and pivotally attached at 25 to a bent lever 26 pivoted at 27 to the operating handle and provided with a depending thumb-piece or grip. A helical spring 28 encircling the pull-bar 23 normally urges the pawl 21 forward into engagement with its ratchet 17. A stop 29 provided with a bevel face and rigidly secured to support 16 is adapted to engage the pawl 21 at slot 30 to automatically withdraw the pawl when the operating lever 20 is swung backward to its normal or inactive position, which ordinarily is against the vestibule of the car or in such position that it will be out of the way.

The top of housing 19 is closed by a fixed member 31 of the back-off cap which is formed with a depending portion 32 adapted to enter within the top of the housing and a flange 33 adapted to fit over the upper edge of the housing to make a tight closure. The fixed member 31 is retained in place upon the housing 19 by transverse pins or rivets 34 which pass through the housing and through grooves cut in the depending portion 32 of the fixed member 31. In order to overcome any tendency for the member 31 to twist within the housing and also to aid in fitting these two members together a lug 35 is formed on one side of the depending portion 32 and engages a corresponding slot cut on the inside of the top portion of the housing.

The fixed member 31 is formed with an aperture through which the squared top of the brake-staff extends, and offset slightly from the edge of this aperture is an upstanding cylindrical portion 36 preferably formed integral with the other portions of this member. Across the interior of the cylindrical portion 36 are two webs 37 (Fig. 5) separated as at 38 and each having at the center of the cylindrical portion 36 a boss 39 which, on account of the separation 38, forms only a segment of a circle. Each web is connected at 40 to portions of 36 which extend inwardly as far as the edge of the aperture, as shown most clearly in Fig. 5. This construction forms two pairs of oppositely disposed apertures 40ª through the webs with recesses 40ʳ beneath. These apertures and rescesses serve as guides for four fingers 41 of the movable portion of the back-off cap. These fingers depend from and are preferably formed integral with a member 42 which contains a recess having a boss 43 at the inner end, as shown most clearly in Figs. 4 and 7. Two of the fingers are slotted as at 44 to receive a retaining pin 45 which passes through apertures 46 in the cylindrical portion 36 at the ends of the diameter passing through the space 38. The movable member of the back-off cap is held normally in the position shown in Figs. 1, 2 and 7, by a spring 47, which at one end presses against the webs 37 and is retained in place by the bosses 39 and at the other end presses against the inside of member 42 and is retained in place by the boss 43.

The operation of the device is as follows:

When the brakes are to be applied the operating lever 20 is swung forward from its normal position thereby freeing pawl 21 from the retracting lug 29 and allowing its spring 28 to force it into yielding engagement with the ratchet 17. Thereafter the continued forward movement of lever 20 rotates brake-staff 10 and winds the brake chain 12 on drum 11. The foot pawl 15 can be held against ratchet 14 and will prevent the brake-staff from unwinding when the operating lever 20 has reached the end of its forward swing and is to be swung backward to get a new grip on the ratchet 17. This operation may be repeated and the brake-staff ratcheted forward until the chain is wound up to the desired amount. In most cases satisfactory release of the brakes may be effected by first swinging the hand-lever back to its normal position where pawl 21 will be removed from engagement with its ratchet by stop 29 and then kicking off the foot pawl 15 to free the brake-staff and allow the brake beam springs to unwind the chain. Or if desired the foot pawl 15 may be released and the hand-lever 20 allowed to swing back until pawl 21 strikes the stop 29 and automatically releases the brake-staff. Or there may be a graduated release by allowing the operating handle to swing back almost to its normal position, then holding staff 10 by the foot pawl and, with sliding pawl 21 held out of engagement with its ratchet by pressure of the operator's hand on grip 26, swinging the operating lever forward to get a new grip of the operating ratchet, and thus releasing the brake by easy stages.

With any of these modes of release there is danger that the brake chain, through tangling of its turns on drum 11 or through wedging against bracket 13 or other parts of the car structure, will not unwind easily enough to completely release the brakes and it is then that the back-off cap is brought into use. By depressing the movable member 42 of the back-off cap, until the arms 41 slide down along the flat faces at the upper portion of the staff, the housing 19 to which the operating lever is connected will become positively clutched to the brake-staff so that motion of the lever in either direction may be communicated directly to the brake-staff. Oftentimes an oscillating movement of the lever will be sufficient to free the brake chain, but in case it is necessary to impart a brake releasing rotation to the staff it may be conveniently done by clutching the lever and the staff together by the back-off cap when the lever is in the position opposite to that shown in Fig. 1, then swinging the lever into the position shown in this figure, disconnecting the back-off cap from the end of the staff, swinging the lever to its opposite position, and again clutching the lever to the staff by means of the back-off cap and repeating the operation as many times as may be necessary to completely unwind the brake chain.

It will be understood that the back-off cap of the present invention is adapted for use with other forms of ratchet brake mechanism than that with which it has been shown in combination and also that various changes in the details of construction thereof may be made without departing from the principle of the invention.

I claim:

1. In hand-actuated brake mechanism, in combination, a brake-staff, a sleeve rotatably mounted on the staff, an operating handle carried by the sleeve, clutch mechanism for converting an oscillating movement of the handle into a brake-applying movement of the staff, a member attached to the top of said sleeve and provided with guides, and a member slidably mounted within said guides and having a plurality of depending fingers adapted to engage the sides of said brake-staff for effecting a brake-releasing movement of the staff.

2. In hand-actuated brake mechanism, in combination, a brake-staff, a member rotatably mounted on the brake-staff, an operating handle connected to said member, coacting clutch members associated with the staff and the operating handle to rotate the staff when the handle is moved in one direction, and means mounted in said rotatable member and comprising a plurality of depending members adapted to be depressed into engagement with said brake-staff whereby motion of said handle in the opposite direction will produce a reverse rotation of said brake-staff.

3. In hand-actuated brake mechanism, in combination, a brake-staff having an upper end of irregular cross-section, a clutch member mounted on said end, an operating lever formed with a cylindrical portion surrounding said clutch member, a second clutch member slidably mounted on said lever and adapted to engage said first clutch member to rotate the same in one direction and a locking member slidably mounted on said cylindrical portion and having fingers adapted to engage the sides of the brake-staff to positively lock the same to said operating lever.

4. In hand-actuated brake mechanism, the combination of a brake-staff, an operating lever and a clutch for connecting said lever to said staff when said lever is moved in one direction, of means for positively locking said lever and said staff together comprising a member fixed relative to said lever, a second member slidably mounted in said fixed member and formed with a plurality of fingers adapted to engage the end of said brake-staff and means for retaining said fingers normally out of contact with the end of said staff.

5. In hand-actuated brake mechanism, the combination of a brake-staff, a member rotatably mounted with respect to said staff, an operating lever connected to said member and a back-off cap for locking said lever to said staff comprising a fixed portion attached to the end of said rotatable member, a movable portion within said fixed member and having a plurality of fingers adapted to engage the end of said brake-staff, means for normally maintaining said fingers out of engagement with said staff and means for retaining the movable portion of said back-off cap within the fixed portion thereof.

6. In hand-actuated brake mechanism, the combination of a brake-staff having a squared upper end, a sleeve rotatably mounted with respect to said staff, an operating lever connected to said sleeve, a guiding member mounted upon the end of said sleeve, and having a pair of webs therein, apertures through said webs, guides associated with said apertures, a sliding member within said sleeve and having fingers within said apertures and guides, said fingers being formed to engage the squared end of said staff when said sliding member is depressed, means for retaining said sliding member within said guiding member, and means for holding the fingers of said sliding member normally out of engagement with the end of said staff.

In testimony whereof I affix my signature.

ROBERT H. BLACKALL.